United States Patent
Kobayashi et al.

(10) Patent No.: US 6,926,610 B2
(45) Date of Patent: Aug. 9, 2005

(54) POSITION INDICATION DEVICE, AND INFORMATION STORAGE MEDIUM

(75) Inventors: Masatoshi Kobayashi, Kawaguchi (JP); Nobutaka Kobayashi, Tokyo (JP); Nobuaki Arai, Tokorozawa (JP)

(73) Assignees: Namco Ltd., Tokyo (JP); Tamura Corporation, Tokyo (JP)

( * ) Notice: Subject to any disclaimer, the term of this patent is extended or adjusted under 35 U.S.C. 154(b) by 257 days.

(21) Appl. No.: 10/069,172
(22) PCT Filed: Jun. 27, 2001
(86) PCT No.: PCT/JP01/05500
   § 371 (c)(1),
   (2), (4) Date: Mar. 19, 2002
(87) PCT Pub. No.: WO02/01340
   PCT Pub. Date: Jan. 3, 2002

(65) Prior Publication Data
   US 2002/0165030 A1 Nov. 7, 2002

(30) Foreign Application Priority Data
   Jun. 27, 2000 (JP) ........................... 2000-192615

(51) Int. Cl.$^7$ ............................................... A63B 67/00
(52) U.S. Cl. ............................. 463/51; 463/52; 463/49
(58) Field of Search ..................................... 463/49–57

(56) References Cited

U.S. PATENT DOCUMENTS

| | | |
|---|---|---|
| 4,619,616 A | 10/1986 | Clarke |
| 4,844,475 A | 7/1989 | Saffer et al. |
| 5,340,115 A | 8/1994 | Shirai et al. |
| 6,110,039 A * | 8/2000 | Oh ................................. 463/2 |
| 6,146,278 A * | 11/2000 | Kobayashi .................... 463/53 |
| 6,251,011 B1 * | 6/2001 | Yamazaki ...................... 463/2 |

FOREIGN PATENT DOCUMENTS

| | | | |
|---|---|---|---|
| EP | 0 848 226 A2 | 6/1998 | |
| EP | 0848226 A2 * | 6/1998 | ........... F41A/33/02 |
| JP | 53-143500 | 11/1978 | |
| JP | U 63-89141 | 6/1988 | |
| JP | A 8-294582 | 11/1996 | |
| JP | A 10-118338 | 5/1998 | |
| JP | A 10-133811 | 5/1998 | |

* cited by examiner

*Primary Examiner*—Julie Brocketti
(74) *Attorney, Agent, or Firm*—Oliff & Berridge, PLC

(57) ABSTRACT

The objective is to prevent erroneous operation of an optical sensor while removing restrictions on the degree of freedom of design. In a handgun-shaped controller comprising a lens for focusing light that is incident on a muzzle and an optical sensor 18 for detecting the thus-focused light, a light-proof case 50 is provided to cover the lens and optical sensor in such a manner that external light other that from a muzzle is not incident thereon. The light-proof case covers the entire surface of the optical sensor and the portion of the board on which the optical sensor is mounted. Cut-out portions 54A and 54B for through-holes for signal terminals 19 are provided in a connection portion between parts 50A and 50B that form the light-proof case. A protuberant portion is provided on the connection portion of one part 50A and a fit portion thereof is provided in the connection of another part 50B. A protuberant portion is provided so as to deform when a board 70 is pressed into slits 52A and 52B, sealing the gaps between the slits and the board. The configuration could be such that the entirety of the board is covered by the light-proof case and the optical sensor is attached directly within the light-proof case.

28 Claims, 13 Drawing Sheets

POSITION INDICATION DEVICE, AND INFORMATION STORAGE MEDIUM

TECHNICAL FIELD

The present invention relates to a position indication device for indicating a position within a screen of a display device, and to an information storage medium.

BACKGROUND ART

Game systems have been developed and implemented in the art, to enable a player to use a position indication device such as a handgun-shaped controller to shoot at a target object. In such a game system, a player 302 holds a handgun-shaped controller 300, aims at a target object displayed on a screen 312 of a display device 310, and pulls a trigger 304. When that happens, a position 314 indicated by the handgun-shaped controller 300 is detected optically by using means such as an optical sensor within the handgun-shaped controller 300. If the indicated position 314 of the handgun-shaped controller 300 matches the position of the target object that is displayed on the screen 312, a hit is determined; if it does not match, a miss is determined. Prior-art techniques for implementing such a handgun-shaped controller and game system are disclosed in Japanese Patent Application Laid-Open No. 10-118338, by way of example.

The intensity of light output from a display device such as a television is extremely low, on the order of 300 lux. For that reason, an extremely sensitive optical sensor is used within the handgun-shaped controller 300.

The intensity of external light (environmental light) in the real world, however, is extremely strong and can be on the order or ten to twenty thousand lux outdoors, by way of example. Therefore, if the game system of FIG. 1 is taken outside with the objective of entertaining a home party or the like, the optical sensor within the handgun-shaped controller 300 is likely to react to the external light, not the light from the display device 312, which will raise the problem of erroneous operation.

One method that could be considered for solving such a problem is to form the casing (indicator body) of the handgun-shaped controller 300 of a material that is highly light-proof. Use of such a method ensures that external light is excluded by the casing made of the highly light-proof material, making it possible to solve the problem of the optical sensor reacting to external light.

If this method is used, however, the material of the casing of the handgun-shaped controller 300 is limited to materials that are highly light-proof, which restricts the color of the casing. It is therefore difficult to use organic colorants or the like, and it is thus substantially impossible to utilize any of the "skeleton" (translucent) colors and pastel colors that are currently fashionable, as the color of the casing. This restricts the degree of freedom of design of the handgun-shaped controller, with the result that the product value of the handgun-shaped controller is reduced.

DISCLOSURE OF THE INVENTION

The present invention relates to a position indication device for indicating a position within a screen of a display device, the position indication device comprising: an indicator body that indicates a position within a screen of a display device; a lens that is provided in the indicator body and focuses light that is incident from a position indicated by the indicator body through a light-incident aperture of the indicator body; an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor.

The present invention also relates to a computer-usable information storage medium used in a game system that comprises: the above-described position indication device; game processing means that receives information from the position indication device and performs game processing based on the detected indicated position; and image generation means that generates a game image in accordance with the game processing performed by the game processing means, wherein the information storage medium comprises a program for implementing the above means on a computer.

BEST MODE FOR CARRYING OUT THE INVENTION

Figure 1:
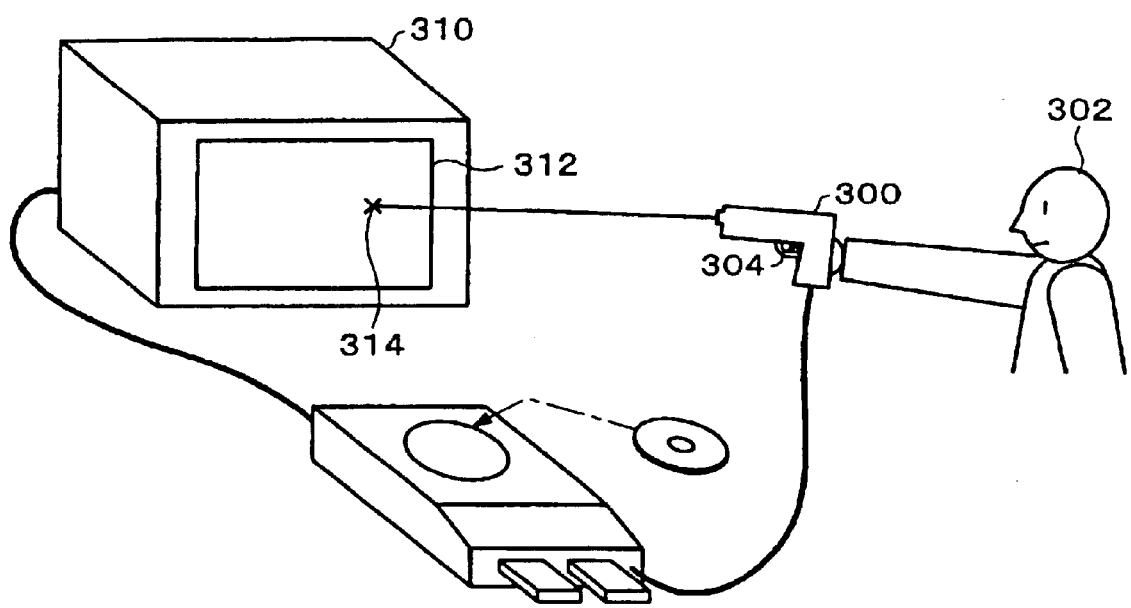
FIG. 1 is illustrative of a game system using a handgun-shaped controller.

There are embodiments of the present invention devised in the light of the above described technical problem. These embodiments may provide a position indication device and an information storage medium that make it possible to prevent erroneous operation of the optical sensor, while removing restrictions on the degree of freedom of design.

Embodiments of the present invention will now be described below.

Note that the embodiments described below do not in any way limit the scope of the present invention defined by the claims laid out herein. Similarly, all the elements of the embodiments below should not be taken as essential requirements defined by the claims herein.

According to one embodiment of the present invention, there is provided a position indication device for indicating a position within a screen of a display device, the position indication device comprising: an indicator body that indicates a position within a screen of a display device; a lens that is provided in the indicator body and focuses light that is incident from a position indicated by the indicator body through a light-incident aperture of the indicator body; an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor.

This embodiment ensures that light from the indicated position within the screen of the display device is focused by the lens and is detected by the optical sensor. It is possible to derive the position indicated by the indicator body by using an optical detection signal from the optical sensor.

With this embodiment of the invention, the lens and optical sensor are covered by the light-proof member in such a manner that external light other than that from the light-incident aperture is not incident on the lens and optical sensor. This makes it possible to prevent erroneous operation of the optical sensor caused by the optical sensor reacting to external light, thus preventing errors in the detection of the indicated position.

The light-proof member may cover the optical sensor in such a manner as to prevent the incidence of external light to all surfaces of the optical sensor, including a surface on which a signal terminal of the optical sensor is provided. This makes it possible to prevent the problem of erroneous operation of the optical sensor due to the incidence of external light such as that from the surface on the signal terminal side of the optical sensor.

The light-proof member may cover at least a board portion on which the optical sensor is mounted, of a board for mounting the optical sensor. This makes it possible to prevent the problem of external light passing through the board on which the optical sensor is mounted and being incident on the optical sensor.

The light-proof member may be configured of an assembly of a plurality of parts; and a cut-out portion may be provided in a connection portion between parts of the light-proof member, in order to form a through-hole for a signal terminal of the optical sensor. This makes it possible to connect together the parts with the optical sensor already mounted on the board, to cover the optical sensor with the light-proof member, thus simplifying the assembly.

The light-proof member may be configured of an assembly of a plurality of parts; and a protuberant portion may be provided in a connection portion of a first part of the plurality of parts, and also a fit portion that fits with the protuberant portion may be provided in a connection portion of a second part of the plurality of parts. This makes it possible to prevent the incidence of external light through gaps in the connection portions between the parts, thus increasing the light-proofing of the light-proof member.

The light-proof member may cover a board portion on which the optical sensor is mounted, of a board for mounting the optical sensor; and a second light-proof member may be provided to prevent the incidence of the external light from a gap between the board and a slit provided in the light-proof member for the insertion of the board. This makes it possible to cover part of the board with the light-proof member, by inserting the board on which the optical sensor is mounted in a slit, and also enables effective light-proofing by the second light-proof member with respect to external light from gaps between the board and the slit.

The light-proof member may be configured of an assembly of a plurality of parts; and the second light-proof member may be a protuberant portion that is deformed by the insertion of the board into the slit provided in each part of the light-proof member and may seal the gap between the slit and the board. This enables effective light-proofing with respect to external light from the gap between the board and the slit, with a simple assembly step of merely pressing the board into the slit, and also makes it possible to increase the accuracy with which the parts are assembled.

The light-proof member may cover the entirety of a board on which the optical sensor is mounted; and a second light-proof member may be provided to prevent the incidence of external light from a gap between a lead wire from the board and a lead hole provided in the light-proof member for the extraction of the lead wire. This makes it possible to cover the entire optical sensor with the light-proof member, without providing a slit for the insertion of the board in the light-proof member.

The optical sensor may be installed directly within the light-proof member; and a second light-proof member may be provided to prevent the incidence of external light from a gap between a lead wire from a signal terminal of the optical sensor and a lead hole provided in the light-proof member for the extraction of the lead wire. This makes it possible to cover the entire optical sensor with the light-proof member, without providing a board for the mounting of the optical sensor.

According to one embodiment of the present invention, there is provided a computer-usable information storage medium used in a game system that comprises: the above-described position indication device; game processing means that receives information from the position indication device and performs game processing based on the detected indicated position; and image generation means that generates a game image in accordance with the game processing performed by the game processing means, wherein the information storage medium comprises a program for implementing the above means on a computer. According to one embodiment of the present invention, there is provided a computer-usable program (including a program embodied in a carrier wave), comprising a processing routine for implementing the above-described means on a computer.

Since this embodiment makes it possible to efficiently prevent erroneous operation of the optical sensor installed within the position indication device, even if there is strong external light around the game system, thus preventing errors such as the occurrence of erroneous detection of the indicated position or mistaken determination of whether or not a shot has hit a target object. It is therefore possible to provide a comfortable game environment for the player, increasing the marketability of the game system, information storage medium, and program.

These embodiments are described below with reference to the accompanying figures.

1. Overall Configuration of Game System

Figure 2:
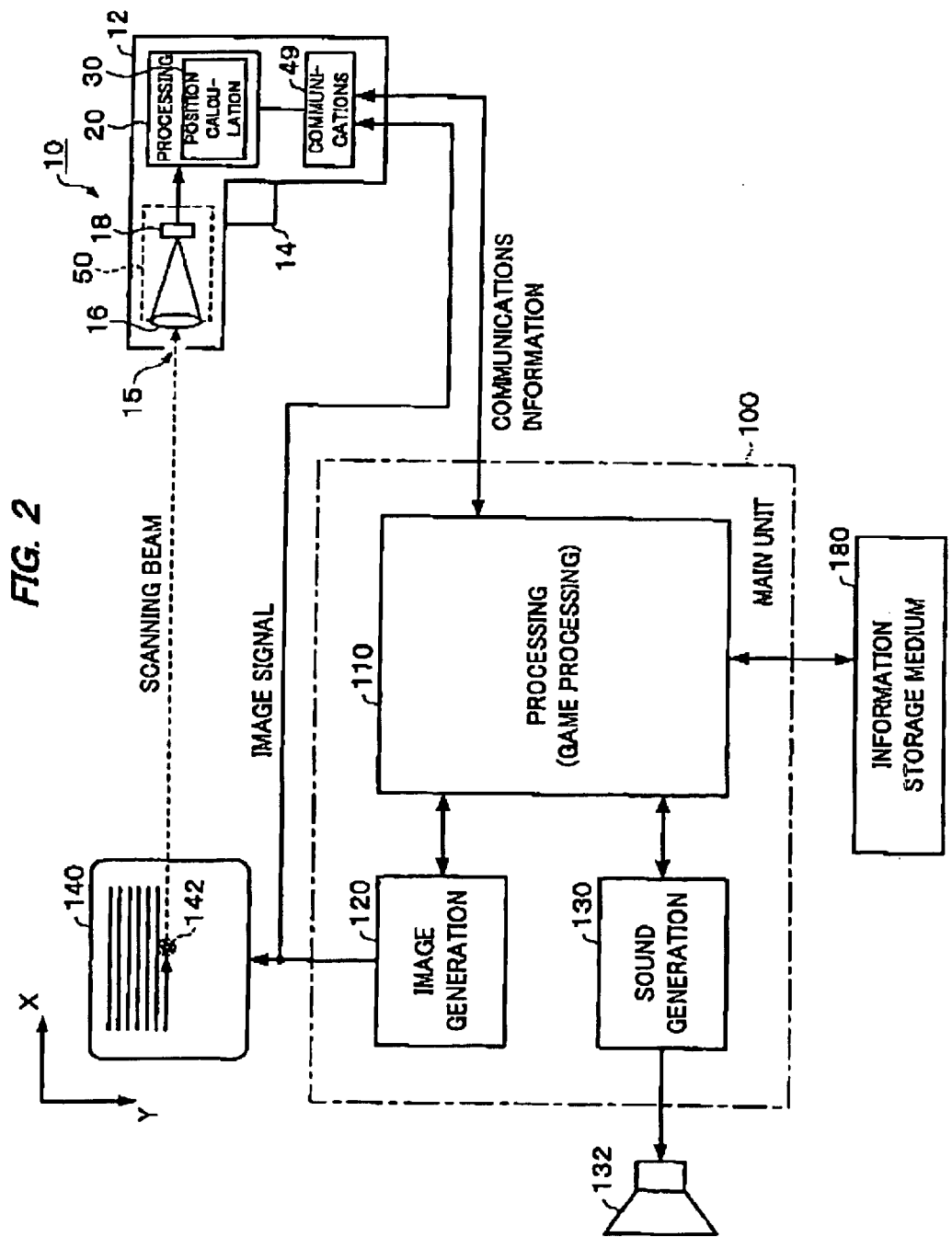
FIG. 2 shows an example of the configuration of a game system using a handgun-shaped controller in accordance with one embodiment of the present invention.
Figure 3:
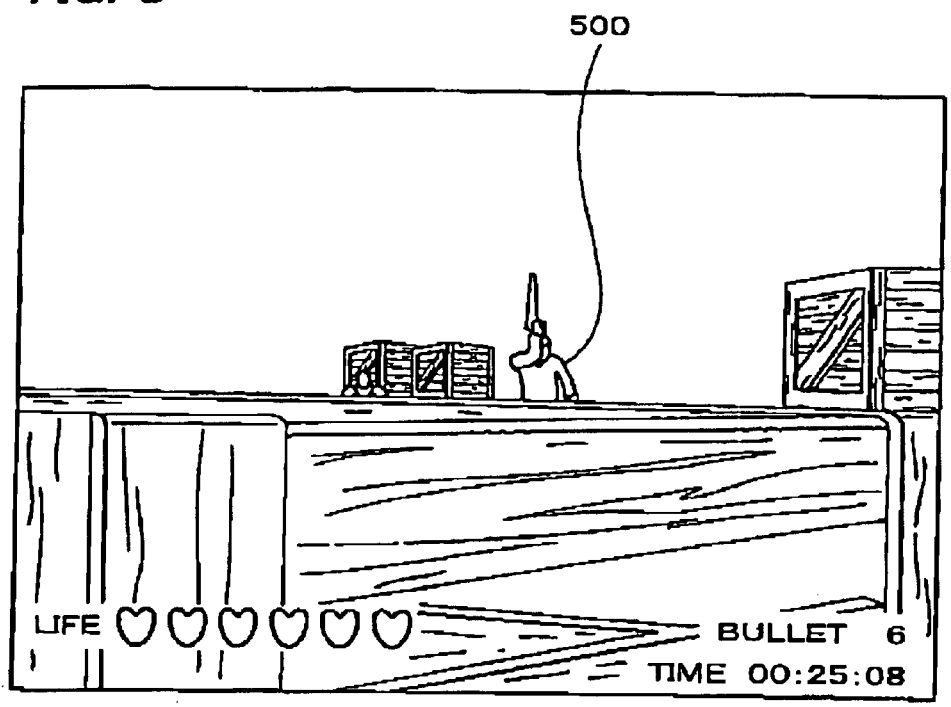
FIG. 3 shows an example of a game image generated by the game system of FIG. 2.

An example of the configuration of a game system (image generation system) that uses the handgun-shaped controller (broadly speaking: a position indication device) according to one embodiment of the present invention is shown in FIG. 2.

A main unit 100 (such as a domestic game system) comprises a processing section 110, an image generation section 120, and a sound generation section 130.

In this case, the processing section 110 (processor) performs processing such as control of the entire device and game processing, based on programs and data stored in an information storage medium 180 and communications information to and from a handgun-shaped controller 10. The functions of this processing section 110 could be implemented by hardware such as various different processors (such as a CPU or DSP) or an ASIC (gate array), or by a given program (game program).

The processing performed by the processing section 110 in this case includes: processing for setting various modes, processing for moving the game forward, processing for setting selection screens, processing for obtaining the position and rotational angle (about the X, Y, or Z axis) of an object (one or a plurality of primitive surfaces), processing for causing an object to move (motion processing), processing for obtaining the position of a viewpoint (position of a virtual camera) and the angle-of-view thereof (rotational angle of the virtual camera), processing for disposing objects such as map objects in an object space, hit-check processing, processing for calculating game results (results and score), processing for enabling a plurality of players to play in a common game space, and game-over processing.

The image generation section 120 performs various types of image processing in accordance with directions from the processing section 110, and generates game images (image signals) on a screen of a display device 140 (television receiver). The sound generation section 130 generates game sounds such as background music, sound effects, and voices in accordance with directions from the processing section 110, for output to a sound output device 132 (speaker). The functions of the image generation section 120 and the sound generation section 130 could be implemented by hardware such as various different processors or image-creation and sound-creation ASICs, or by a given program.

The information storage medium 180 (a storage medium that can be used by a computer) is designed to store information such as programs and data, and its functions could be implemented by hardware such as an optical disk (CD or DVD), a magneto-optical (MO) disk, a magnetic disk, a hard disk, magnetic tape, or ROM. The processing section 110 performs the various types of processing in accordance with the present invention (embodiments of the invention), based on the information stored in this information storage medium 180. In other words, the information storage medium 180 contains information (program or data) for implementing the means of the present invention (embodiments of the invention).

Note that the program or data for implementing the means of the present invention (embodiments of the invention) could be transferred to the information storage medium 180 through a network from an information storage medium of a host device (server). The use of such an information storage medium at a host device (server) is also comprised within the scope of the present invention.

The handgun-shaped controller 10 comprises an indicator body 12 (casing) formed in the shape of a handgun, a trigger 14 provided in a grip portion of the indicator body 12, an optical circuit formed of a lens 16 and an optical sensor 18 in the interior close to a muzzle 15 (light-incident aperture) of the indicator body 12, a light-proof case 50 that covers the lens 16 and the optical sensor 18 in such a manner that external light other than light from the muzzle 15 is not incident thereon, a processing section 20 that controls the entire handgun-shaped controller and performs calculations such as those to determine the indicated position, and a communications section 49 that functions as an interface with the main unit 100.

Note that the functions of the processing section 20 and the communications section 49 could be implemented by hardware such as an ASIC, or by a combinations of various processors and software.

The description now turns to an outline of the operation of the game system of FIG. 2.

First of all, the image generation section 120 of the main unit 100 generates an image signal and the CRT of the display device 140 is energized by the thus-generated image signal. This causes an object such as a target object 500 (an enemy character) to appear on the screen of the display device 140.

If the player than points the muzzle 15 of the handgun-shaped controller 10 towards the display device 140 to aim at the target object 500 on the screen, and pulls the trigger 14, the screen flashes for just one frame. If the raster scan of the display device 140 passes through a detection area 142 that has been set in the vicinity of the position indicated by the handgun-shaped controller 10, the scanning beam at that point is focused by the lens 16 into the optical sensor 18. This causes the optical sensor 18 to output an optical detection signal.

When this happens, a position calculation section 30 of the processing section 20 that has received the optical detection signal calculates the position (X and Y coordinates) indicated by the handgun-shaped controller 10. During this time, the position calculation section 30 uses the synchronization signal comprised within the image signal from the main unit 100 to calculate the position indicated by the handgun-shaped controller 10.

Information on the thus-calculated indicated position is sent to the main unit 100. The processing section 110 of the main unit 100 performs a hit-check with the target object 500 shown on the screen, based on this indicated position information. In other words, if the indicated position matches the position of the target object 500, it is determined that a virtual shot has hit the target object; if they do not match, it is determined to be a miss.

2. Characteristics of these Embodiments 2.1 Light-proof Case

Figure 4:
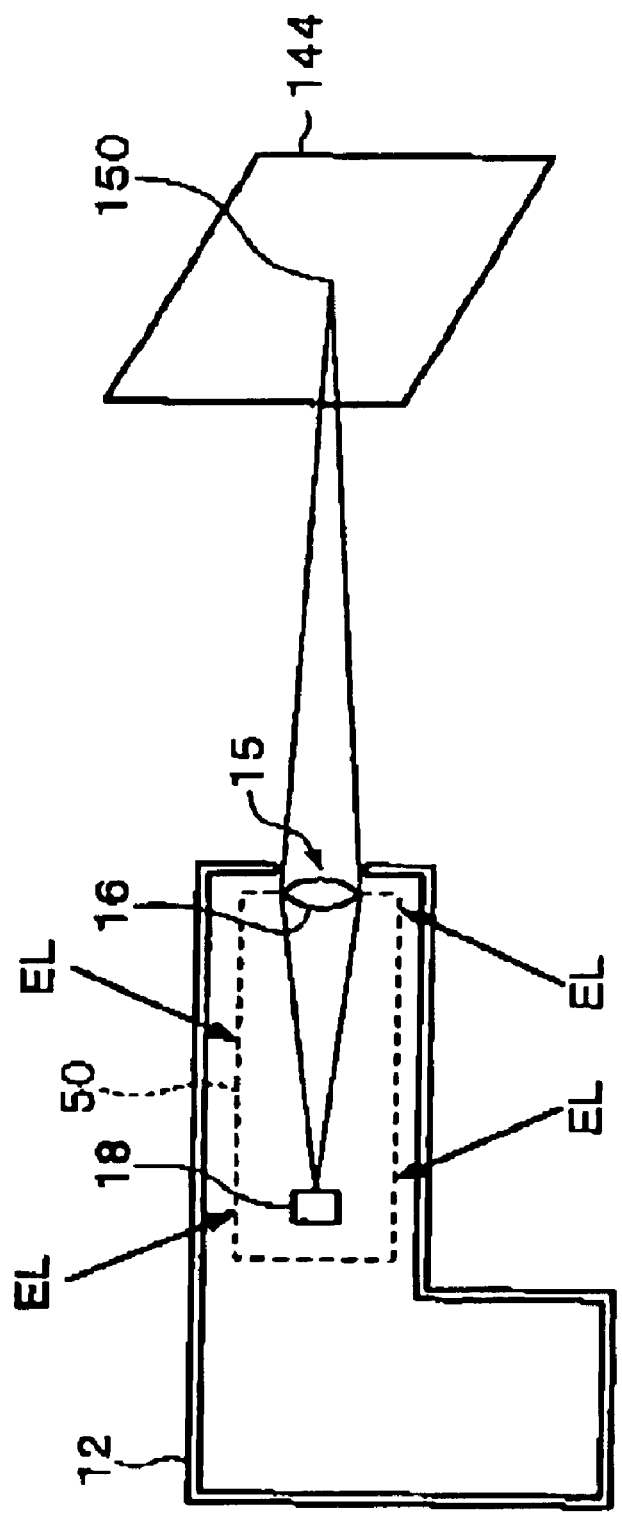
FIG. 4 is illustrative of a method of covering the optical sensor and lens with a light-proof case.

As shown in FIG. 4, the lens 16 focuses light that is incident from an indicated position 150 within a screen 144, through the muzzle 15 (light-incident aperture). The optical sensor 18 detects the thus-focused light and outputs an optical detection signal to the processing section 20 in a later stage (see FIG. 2). Thus the position (X and Y coordinates) within the screen 144 of the indicated position 150 are detected.

With this embodiment, the lens 16 and the optical sensor 18 are covered by the light-proof case 50 (broadly speaking: a light-proof member) in such a manner that external light EL other than the light from the muzzle 15 is not incident on the lens 16 and the optical sensor 18. This makes it possible to prevent the problem of erroneous operation due to the optical sensor 18 reacting to the external light EL.

In other words, the intensity of light from the indicated position 150 of the screen 144 is on the order of 300 lux, which is extremely low.

In contrast thereto, the intensity of external light EL in the real world is extremely strong and can be on the order of ten to twenty thousand lux outdoors, by way of example.

If the light-proof case 50 shown in FIG. 4 is not provided, therefore, a problem will arise in that the optical sensor 18 will react to the external light EL instead of the light (scanning beam) from the indicated position 150, leading to erroneous operation and operating faults.

In such a case, if a method is used of forming the indicator body 12 (casing) of the handgun-shaped controller of a material that is highly light-proof, for example, the problem of erroneous operation of the optical sensor 18 due to external light EL can be solved to a certain degree.

However, the use of such a method means that only a limited selection of materials can be used for the indicator body 12. The degree of freedom of design of the handgun-shaped controller is therefore restricted.

To make the color of the indicator body 12 a pastel color that imparts a gentle neutral image, for example, it is necessary to arrange to use an organic colorant that is not very light-proof, for the plastic that forms the indicator body 12. If, however, a large proportion of organic colorant that is not very light-proof is used in this manner, the light-proofing capabilities of the indicator body 12 will be low and thus part of the external light EL will pass through the indicator body 12. The optical sensor 18, which is highly sensitive to react to the weak light from the indicated position 150, will therefore tend to react to the external light EL that has passed through the indicator body 12, raising the problem of erroneous operation. For that reason, it is difficult to use a pastel color as the color of the indicator body 12, and it is inevitable that a large ratio of highly light-proof inorganic colorant must be used.

If the color of the indicator body 12 is to be one of the currently fashionable "skeleton" (translucent) colors, substantially all of the external light EL will pass through the indicator body 12, making it impossible to expect the handgun-shaped controller to operate normally. It is therefore not possible to add a "skeleton" type of handgun-shaped controller to the product line-up, with the result that the product value of the handgun-shaped controller is reduced.

In contrast thereto, embodiments of the invention ensure that the lens 16 and the optical sensor 18 are completely covered by the light-proof case 50, which is of a black pipe shape made of a material such as plastic with a large proportion of extremely light-proof carbon (ASB). External light EL is thereby prevented from being incident on the lens 16 and the optical sensor 18, making it possible to solve the problem of erroneous operation of the optical sensor 18.

If the color of the indicator body 12 is made a pastel color or "skeleton" color, by way of example, the lens 16 and the optical sensor 18 are still covered by the light-proof case 50 so that the optical sensor 18 does not react to any external light EL, even if a large amount of external light EL does pass through the indicator body 12. It is therefore possible to use a highly design-worthy pastel color or a fashionable "skeleton" color for the color of the indicator body 12, enabling a huge increase in the product value of the handgun-shaped controller.

2.2 Light-proof for Board

Figure 5:
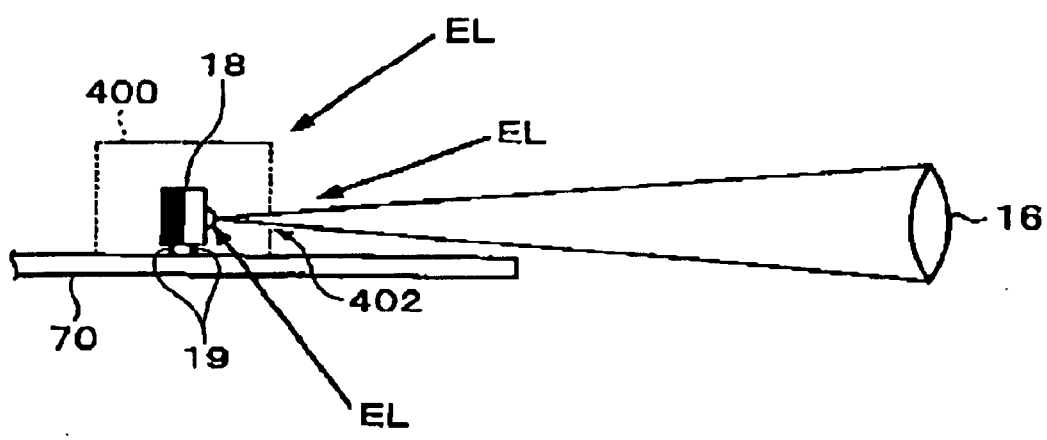
FIG. 5 is illustrative of a comparative example for embodiments of the present invention.

There is provided a comparative example in which a light-proof case 400 is provided in such a manner that it covers only the portion above the optical sensor 18 mounted on a board 70 (printed circuit board), as shown in FIG. 5.

The light-proof case 400 of the comparative example of FIG. 5 does not cover the lens 16. The external light EL that passes through a light-incident aperture 402 that passes light from the lens 16 is also incident on the interior of the light-proof case 400, causing erroneous operation of the optical sensor 18.

In the comparative example of FIG. 5, the light-proof case 400 does not cover the surface on a signal terminal 19 side of the optical sensor 18. In addition, the board 70 on which the optical sensor 18 is mounted is formed of a resin that is not particularly light-proof, such as paper epoxy or paper phenol. With the configuration of this comparative example, external light EL that comes from the rear surface of the board 70 will pass through the board 70 and be incident on the optical sensor 18, causing erroneous operation of the optical sensor 18.

In one embodiment of the present invention, however, the optical sensor 18 is covered by the light-proof case 50 in such a manner that all surfaces of the optical sensor 18, including the surface on which the signal terminals 19 are provided, are protected from the incidence of external light EL.

Figure 6:
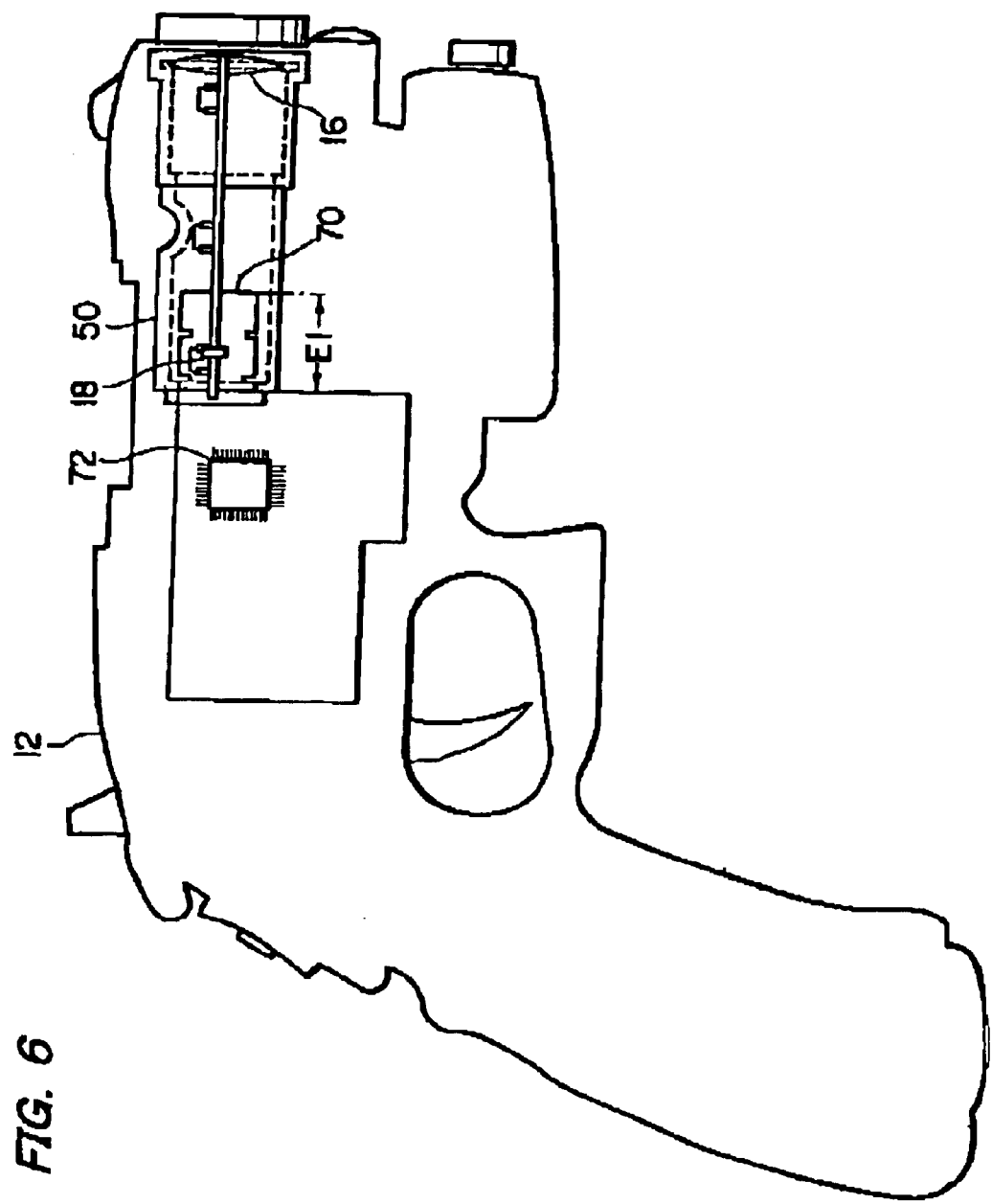
FIG. 6 is illustrative of a method of using a light-proof case to cover part of a board on which the optical sensor is mounted.

This makes it possible to implement a configuration in which the portion board portion on which the optical sensor 18 is mounted (denoted by E1), of the entire board supporting the optical sensor 18, is covered by the light-proof case 50, as shown in detail in FIG. 6, by way of example.

In other words, various other devices for implementing the functions of the processing section 20 of FIG. 2, such as an IC 72, are mounted on the board 70 in addition to the optical sensor 18. The part of the board 70 on which the optical sensor 18 is mounted is covered by the pipe-shaped light-proof case 50, as shown in FIG. 6.

This makes it possible to ensure that the board portion on which the optical sensor 18 is mounted is light-proofed by the light-proof case 50 so that external light EL is not incident thereon. It is therefore possible to efficiently prevent the problem that arises with the comparative example of FIG. 5 in that external light EL that has passed through the board 70 is incident on the signal terminal 19 side of the optical sensor 18.

It is sufficient that the light-proof case 50 covers only the local portion on which the optical sensor 18 is mounted, not the entire board 70. It is therefore possible to make the light-proof case 50 smaller and also simplify the structure of the light-proof case 50, thereby reducing the cost of the handgun-shaped controller.

The light-proof case 50 covers not only the optical sensor 18 but also the lens 16. It is therefore possible to prevent the problem that occurs with the comparative example of FIG. 5, in that external light EL passes through the light-incident aperture 402 and is incident on the interior of the light-proof case 400.

2.3 Simplification of Assembly Process

As described above, it is effective to provide the light-proof case 50 to prevent erroneous operation of the optical sensor 18. However, if the resultant number of steps in the assembly of the handgun-shaped controller increases and the number of components of the handgun-shaped controller also increases, the cost of the handgun-shaped controller will increase. An important technical concern is therefore how to enable the construction of the handgun-shaped controller with a reduced number of assembly steps and number of components. For that reason, the method discussed below is used for the embodiments of the invention.

Figure 7:
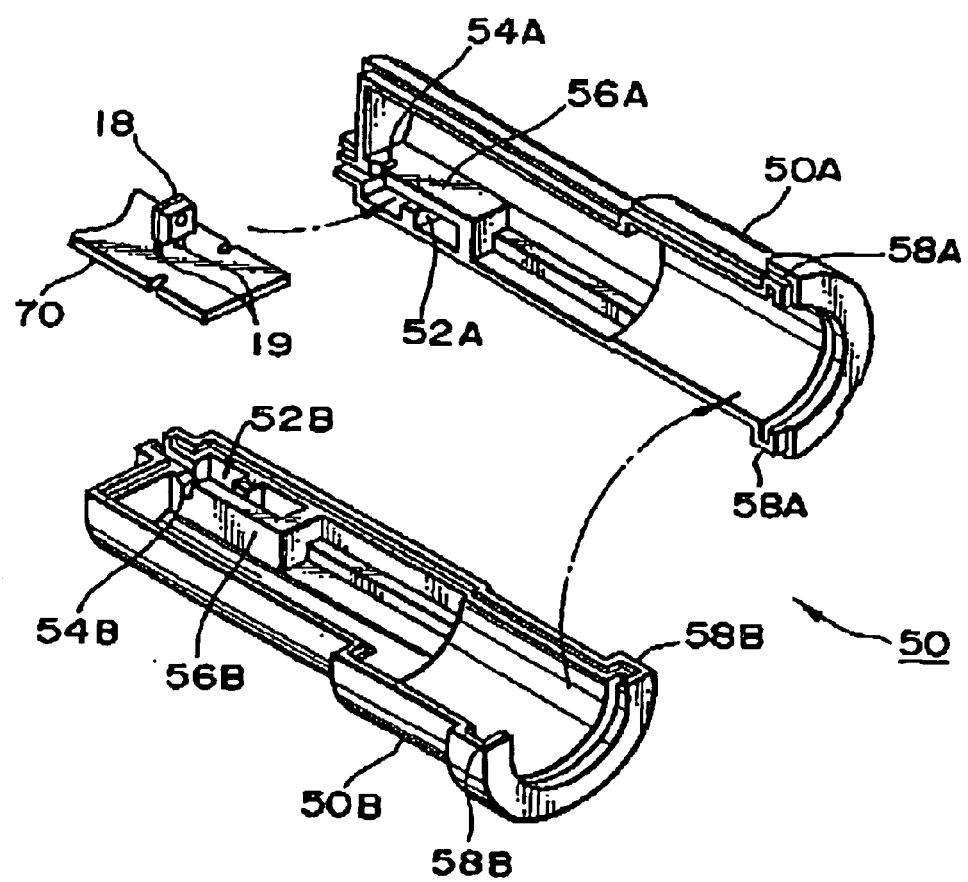
FIG. 7 is illustrative of a method that simplifies the assembly of the handgun-shaped controller.

In other words, the light-proof case 50 is formed from an assembly of a plurality of parts 50A and 50B that are connected together (the assembly could also comprise three or more parts), as shown in FIG. 7.

During the assembly of the light-proof case 50, one side of the board 70 on which the optical sensor 18 is mounted is inserted (pressed) into a slit 52A provided in the part 50A.

The parts 50A and 50B are then connected together, with the other side of the board 70 being inserted (pressed) into a slit 52B formed in the part 50B.

This makes it possible for the light-proof case 50 configured of the parts 50A and 50B to cover the board 70, with the optical sensor 18 already mounted on the board 70. It is therefore possible to simplify the process of assembling the handgun-shaped controller, minimizing the number of additional assembly steps created by the provision of the light-proof case 50.

A different method from that of FIG. 7 could be considered, in which the optical sensor 18 is mounted on the board 70 after the board 70 has been covered by the light-proof case 50. However, such a method would raise a problem in that the task of mounting the optical sensor 18 on the board 70 is complex and the workability of this assembly is low. In one embodiment of the invention, the parts 50A and 50B are connected together with the optical sensor 18 already mounted on the board 70, so that the optical sensor 18 is covered by the light-proof case 50, enabling efficient prevention of problems such as that described above.

Figure 8:
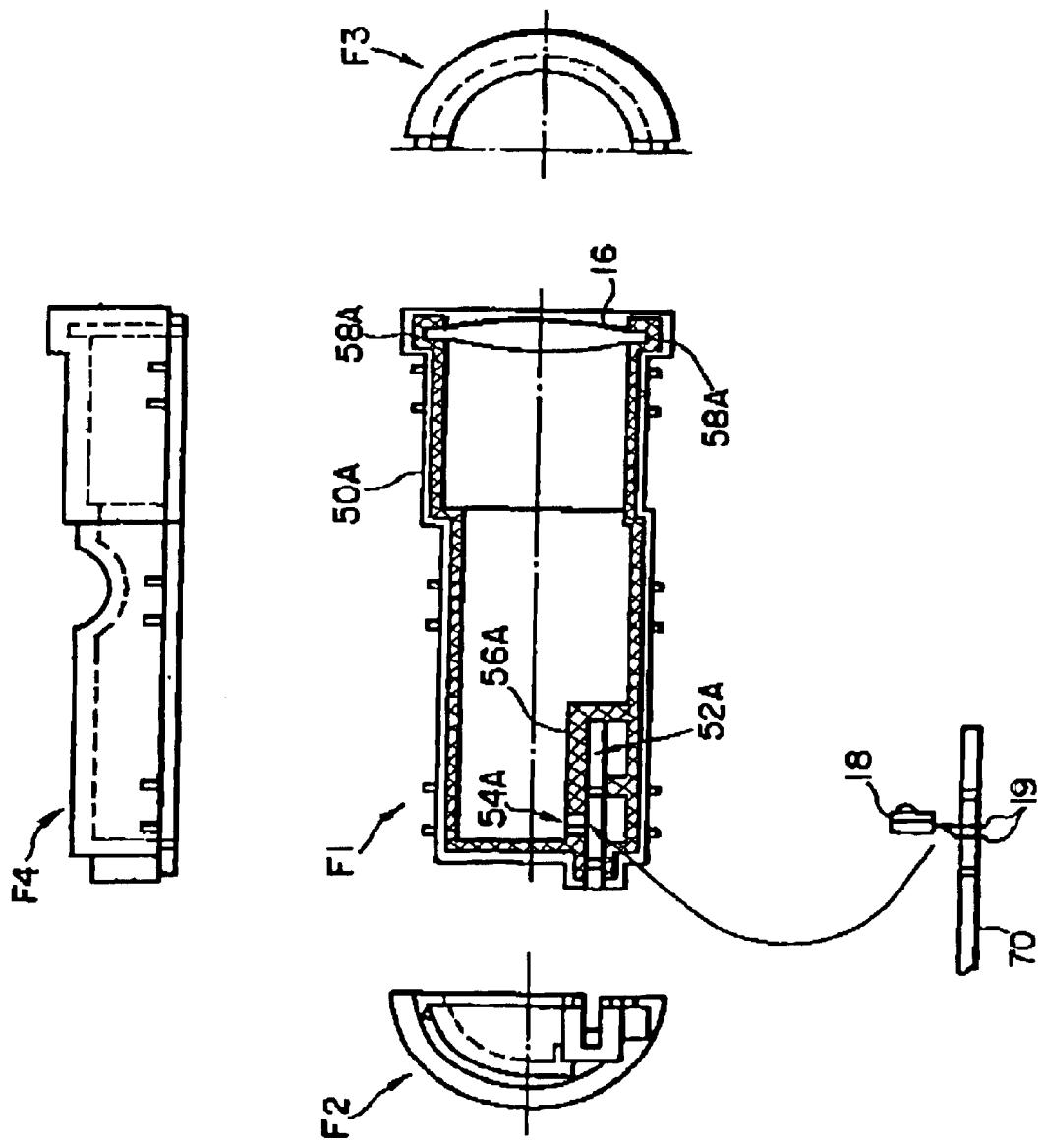
FIG. 8 shows an example of the front view, side views, and plan view of one part that forms the light-proof case.

Note that F1 in FIG. 8 denotes a front view of the part 50A, F2 and F3 denote side views thereof, and F4 denotes a plan view. Similarly, G1 in FIG. 9 denotes a front view of the part 50A, G2 and G3 denote side views thereof, and G4 denotes a plan view. The cross-hatched portions of FIGS. 8 and 9 denote the connection surfaces of the parts 50A and 50B. The broken lines denote the inner walls of the light-proof case 50 (the parts 50A and 50B).

Figure 9:
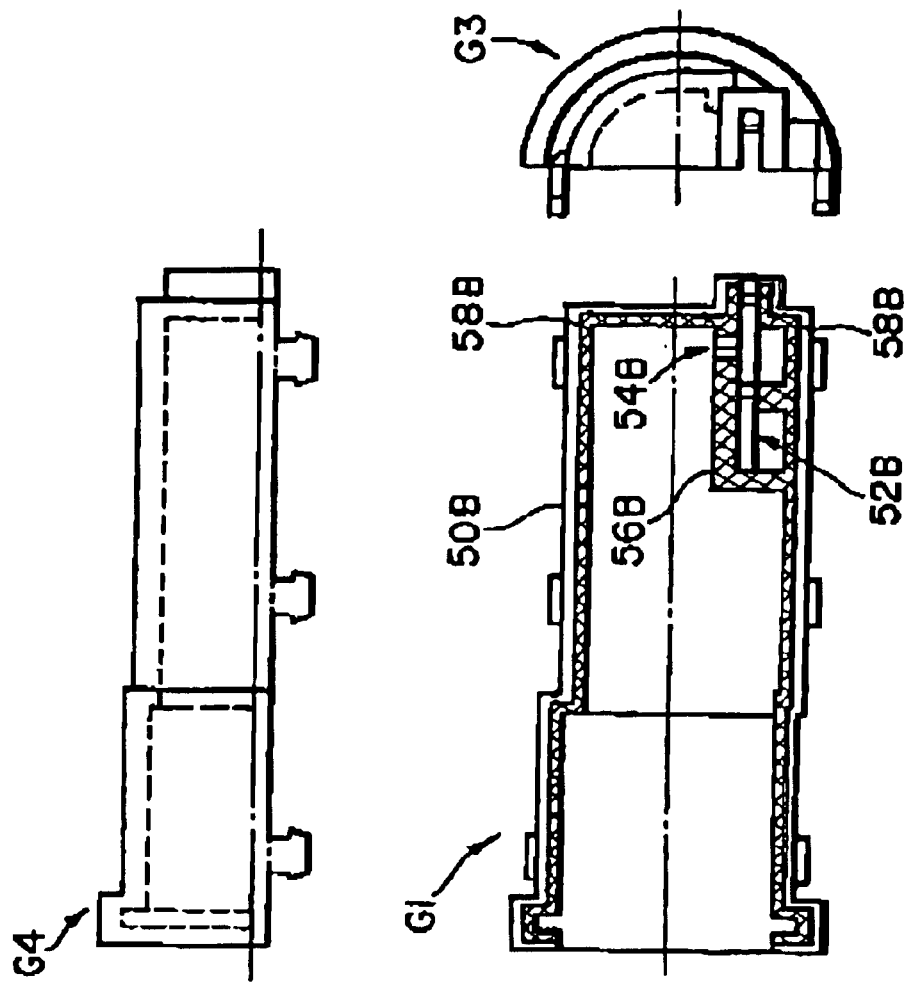
FIG. 9 shows an example of the front view, side views, and plan view of another part that forms the light-proof case.

In one embodiment of the invention, cut-out portions 54A and 54B are provided in the connection portions of the parts 50A and 50B (alternatively, cut-out portions could be provided on only one part), as shown in FIGS. 7 to 9.

These cut-out portions 54A and 54B are designed to form through-holes for the signal terminals 19 of the optical sensor 18 when the parts 50A and 50B are connected together. The provision of the cut-out portions 54A and 54B in this manner ensures that it is possible to further simplify the process of covering the board 70 with the light-proof case 50 with the optical sensor 18 already mounted on the board 70.

In addition, when the parts 50A and 50B are connected together, light-proof inner walls 56A and 56B are interposed between the optical sensor 18 and the board 70, as shown in FIGS. 7 to 9. This double-walled structure of the light-proof inner walls 56A and 56B and light-proof outer walls 58A and 58B makes it possible to prevent the incidence of external light on the optical sensor 18 through the cut-out portions 54A and 54B. It is therefore possible to ensure that the light-proofing of the light-proof case 50 is even more secure.

2.4 Light-proofing for Connection Portion

In one embodiment of the invention, a protuberant portion (projection) is provided in the connection portions (the light-proof outer wall 58) of the part 50A of the light-proof case 50 and a fit portion (recess, depression) corresponding to that protuberant portion is provided in the connection portions of the other part 50B, as shown in FIG. 7. These make it possible to greatly increase the light-proofing of the connection portions of the parts 50A and 50B.

Figure 10A:
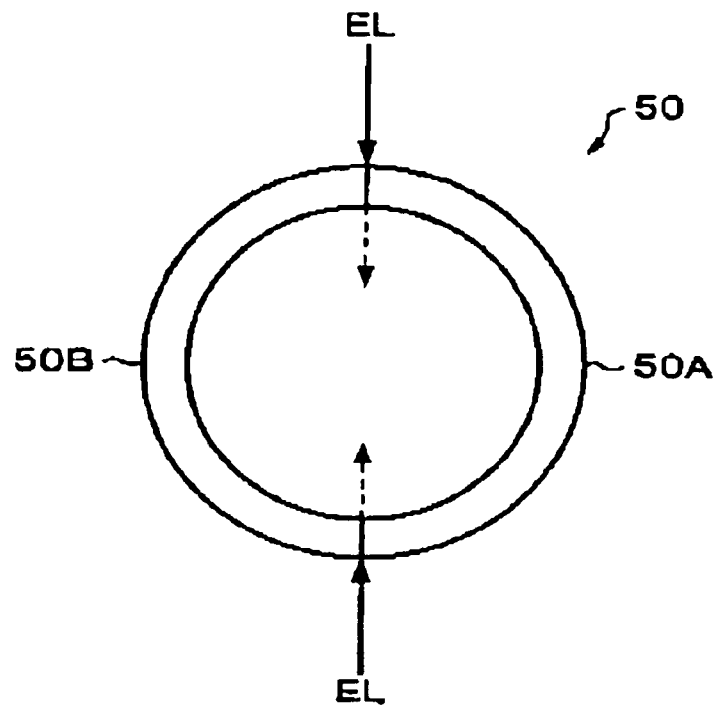
FIGS. 10A and 10B are illustrative of a method of improving the light-proofing of the connection portion between the parts of the light-proof case.

If the parts 50A and 50B are simply connected together without any contrivance, as shown by way of example in FIG. 10A, there is a problem that external light EL will pass through gaps in the connection portions of the parts 50A and 50B and become incident on the interior of the light-proof case 50.

In contrast thereto, this embodiment is designed in such a manner that the protuberant portion of the part 50A and the fit (engagement) portion of the part 50B overlap each other, as seen from the viewpoint of the external light EL. In other words, connection surfaces 60A and 60B are provided on the connection portions of the parts 50A and 50B, extending in a direction that intersects the perpendicular to the outer surfaces of the connection portions. This ensures that external light EL that is incident through any gap in the connection portions of the parts 50A and 50B is shielded by the connection surfaces 60A and 60B that are formed of black plastic, enabling effective prevention of a state in which the external light EL is incident on the interior of the light-proof case 50.

The provision of protuberant portion and corresponding fit portion on the connection portions of the parts 50A and 50B makes it possible to improve the workability of the process of assembling the connections between the parts 50A and 50B, thus improving the accuracy with which the light-proof case 50 is assembled.

Figure 10B:
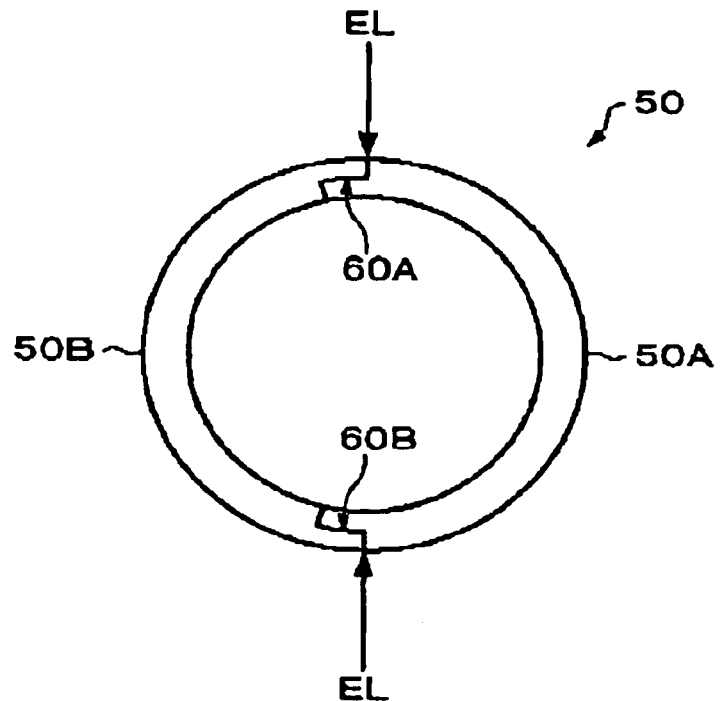

Note that the shapes of the connection portions of the parts 50A and 50B are not limited to those shown in FIGS. 7 and 10B. For example, the protuberant portion of the part 50A could have a tapered shape, and it is also possible to provide a plurality of these protuberant portions.

2.5 Light-proofing of Gaps Between Board and Slits

In the embodiment described with reference to FIG. 7, the board 70 is inserted into the slits 52A and 52B of the parts 50A and 50B during the assembly process. There is therefore a problem that external light will intrude from the gaps between the board 70 and the slits 52A and 52B.

Therefore, a light-proof member is further provided to shield any external light that is incident from the gaps between the board 70 and the slits 52A and 52B.

Figure 11A:
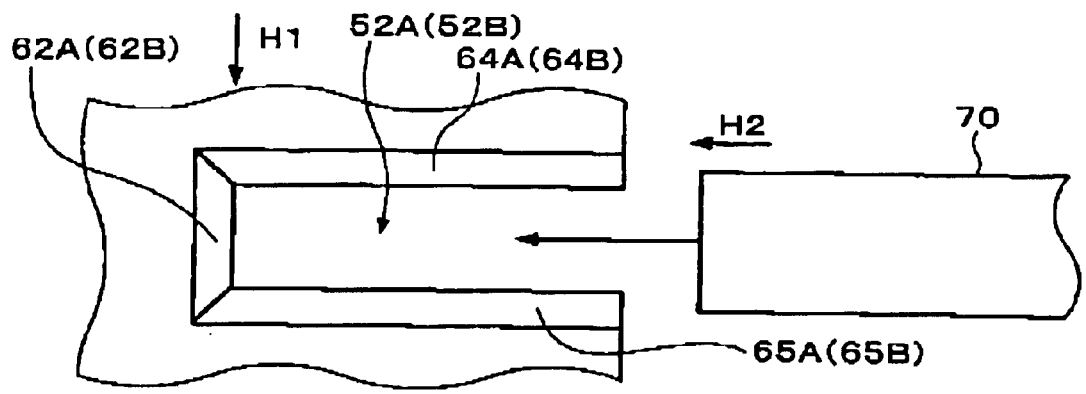
FIGS. 11A, 11B, 11C, and 11D are illustrative of a method of shielding external light from gaps between the board and slits.

More specifically, protuberant portions 62A, 64A, and 65A (or 62B, 64B, and 65B) of a triangular section are provided in the slit 52A (or 52B) that is provided in the part 50A (or 50B), with the thickness of the slit 52A (or 52B) being thinner than that of the board 70, as shown in FIG. 11A.

Figure 11B:
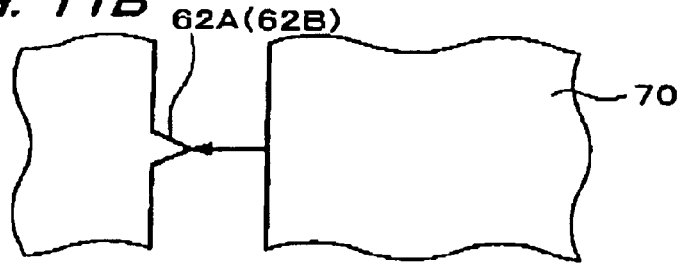
Figure 11C:
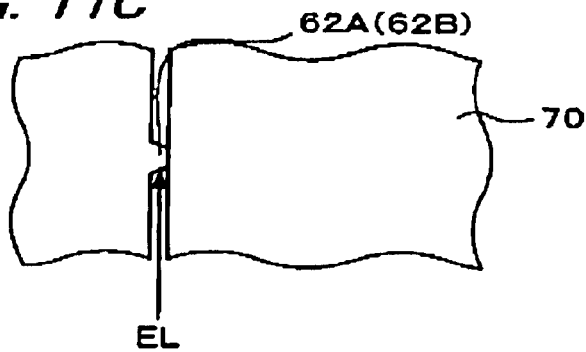
Figure 11D:
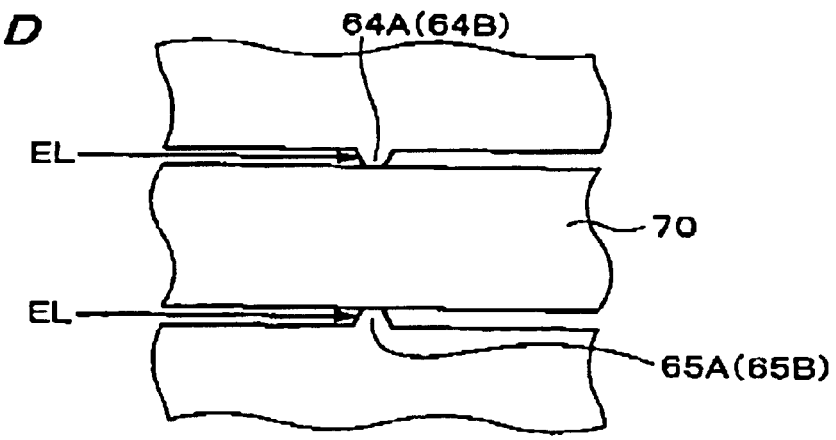

The protuberant portions 62A, 64A, and 65A (or 62B, 64B, and 65B) are deformed by pressing the board 70 into this slit 52A (or 52B), as shown in FIGS. 11B, 11C, and 11D.

Note that FIGS. 11B and 11C show the board 70 and the protuberant portion 62A (62B) as viewed from the direction Hi in FIG. 11A, and FIG. 11D shows the board 70 and the protuberant portions 64A and 65A (64B and 65B) as viewed from the direction 2 in FIG. 11A.

This configuration makes it possible to efficiently prevent any incidence of external light EL from the gaps between the board and the slits, as is clear from FIGS. 11C and 11D. As a result, the light-proofing of the light-proof case 50 can be further completed. In addition, the workability of the process of inserting the board into the slits can be increased and also the accuracy with which the light-proof case 50 is assembled can be increased because of the increased seal between the board and the slits.

Note that various methods other that described with reference to FIGS. 11A to 11D could be used as the method of preventing external light entering from the gaps between the board and the slits. For example, a sealing member (such as rubber packing) could be embedded in the gaps between the board and the slits, or the slits could be adhered together by a light-proof adhesive (such as a black adhesive)

2.6 Other Variants

Part of the board is covered with the light-proof case in FIG. 7, but the configuration could also be such that the entire board is covered by the light-proof case.

Figure 12A:
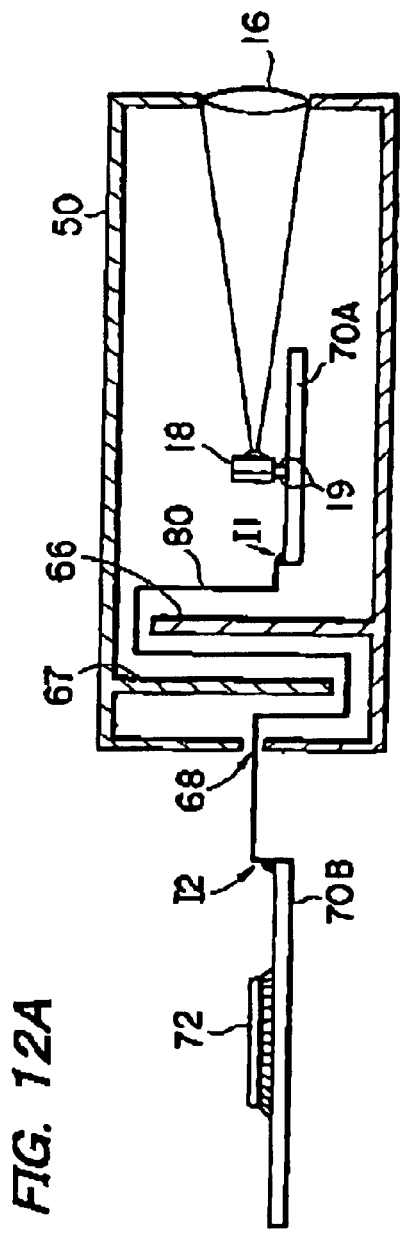
FIGS. 12A and 12B are illustrative of a method of covering the entire board on which the optical sensor is mounted with the light-proof case.

More specifically, the board is divided into a board 70A on which the optical sensor 18 is mounted and a board 70B on which other devices such as the IC 72 are mounted, as shown in FIG. 12A. The entire board 70A is covered by the light-proof case 50. A lead hole 68 for extracting lead wires 80 from the board 70A (lead wires that transfer signals from the signal terminals 19 of the optical sensor 18) is provided in the light-proof case 50.

Figure 12B:
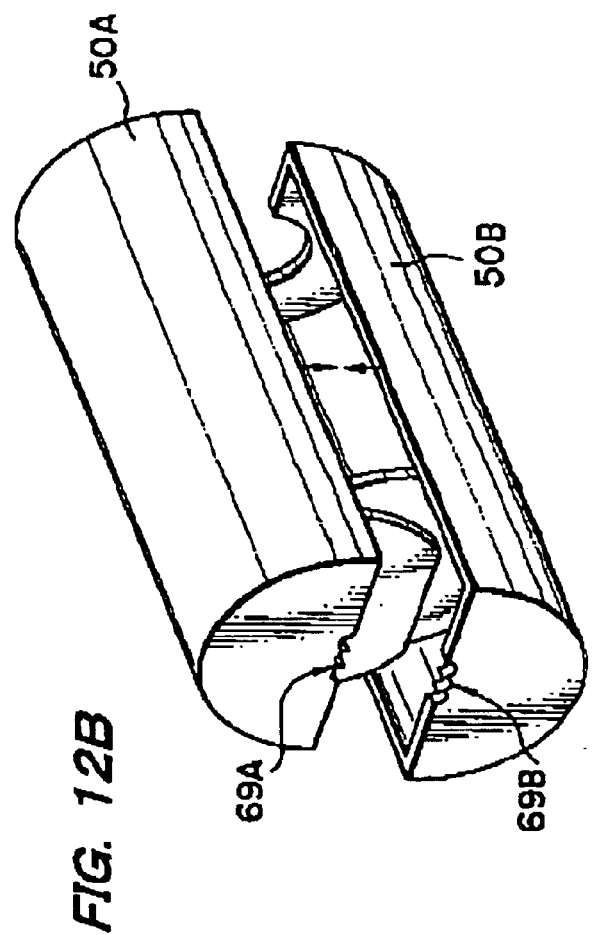

Note that if the light-proof case 50 is formed of a plurality of parts 50A and 50B in this case, as shown in FIG. 12B, it is possible for the optical sensor 18 to be covered by the light-proof case 50 in a state in which the optical sensor 18 has already been mounted on the board 70A. This configuration makes it possible to simplify the process of assembling the light-proof case 50, thus reducing the cost of the handgun-shaped controller.

If the entirety of the board 70A on which the optical sensor 18 is mounted is covered as shown in FIGS. 12A and 12B, it is preferable to provide a light-proof member for shielding any external light that is incident from the lead hole 68 provided in the light-proof case 50 (a lead hole formed of cut-out portions 69A and 69B in FIG. 12B).

More specifically, each of light-proof inner walls 66 and 67 is formed of a material that is highly light-proof, in such a manner as to protrude towards opposite walls, as shown in FIG. 12A. External light that passes through the lead hole 68 is prevented from being incident on the optical sensor 18 and the lens 16 by disposing the light-proof inner walls 66 and 67 in such a manner as to overlap as seen from the direction of the lead hole 68.

Note that it is preferable to embed a sealing member such as rubber packing in the gaps between the lead hole 68 and the lead wires 80, in order to further increase the light-proofing of the light-proof case 50.

If the method of FIG. 12A is used, it is possible to completely cover the optical sensor 18 and the lens 16 with the light-proof case 50. However, from the point of view of the number of assembly steps and the number of components, the method of FIG. 7 is more advantageous than that of FIG. 12. This is because the method of FIG. 12A necessitates the addition of a step of soldering at the points indicated by 11 and 12, and it is also necessary to have two boards and provide the lead wires 80. In contrast thereto, the method of FIG. 7 does not necessitate a soldering step, the number of boards need not be more than one, and the lead wires 80 are also unnecessary, enabling reductions in the cost of the handgun-shaped controller.

Figure 13:
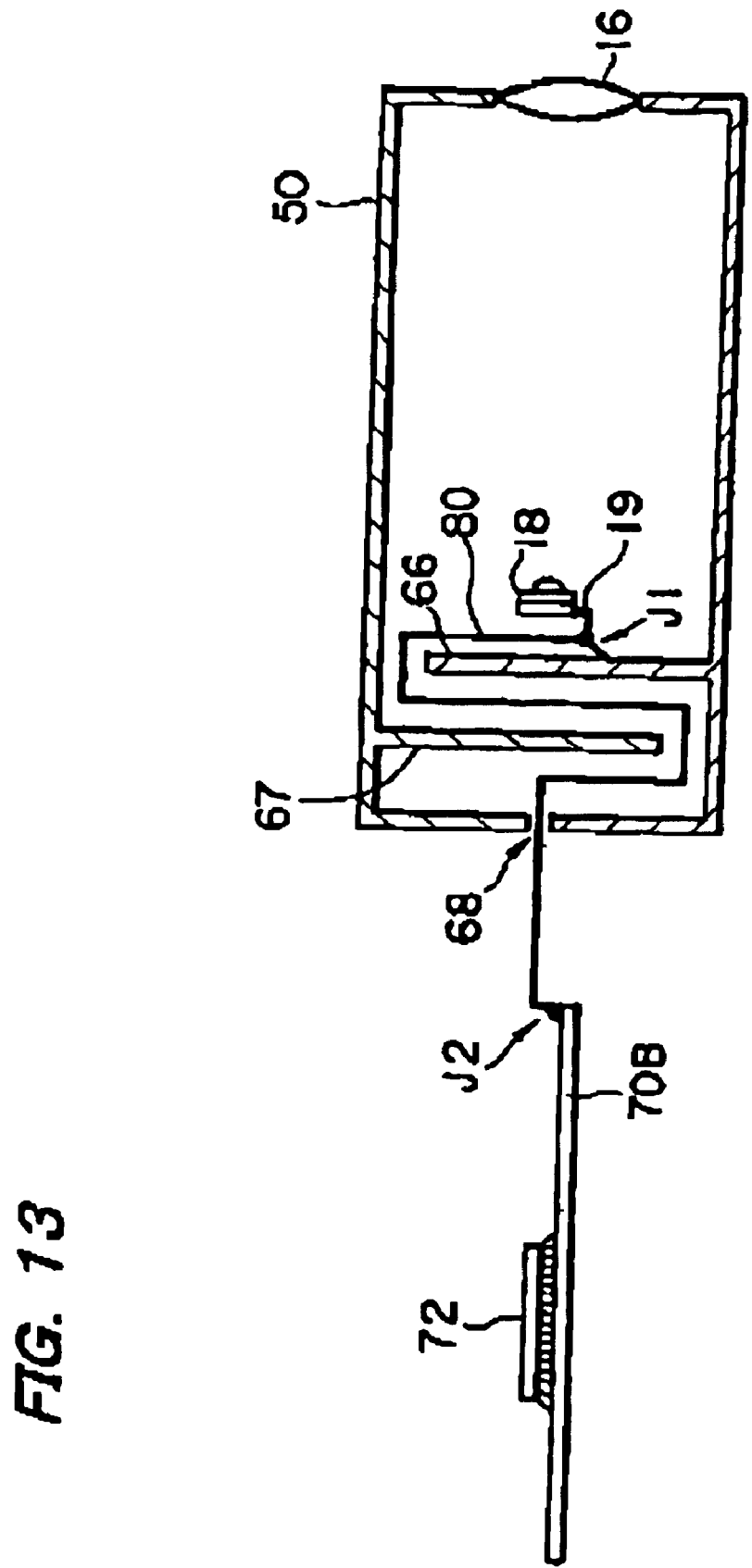
FIG. 13 is illustrative of a method of attaching the optical sensor directly to the light-proof case.

The method shown in FIG. 13 could also be used as a method of covering the optical sensor 18 and the lens 16 completely with the light-proof case 50. In other words, the optical sensor 18 is attached directly to the light-proof case 50, instead of providing a board on which the optical sensor 18 is mounted.

In this case, too, it is preferable to provide light-proof members to ensure light-proofing against external light that is incident from the lead hole 68 (the lead hole for the extraction of the lead wires 80 from the signal terminals 19 of the optical sensor 18).

More specifically, each of light-proof inner walls 66 and 67 is formed of a material that is highly light-proof, in such a manner as to protrude towards opposite walls, as shown in FIG. 13. External light that passes through the lead hole 68 is prevented from being incident on the optical sensor 18 and the lens 16 by disposing the light-proof inner walls 66 and 67 in such a manner as to overlap as seen from the direction of the lead hole 68.

If the method of FIG. 13 is used, it is possible to completely cover the optical sensor 18 and the lens 16 with the light-proof case 50. However, from the point of view of the number of assembly steps and the number of components, the method of FIG. 7 is more advantageous than that of FIG. 13. This is because the method of FIG. 13 necessitates the addition of a step of soldering at the points indicated by J1 and J2, and it is also necessary to provide the lead wires 80. In contrast thereto, the method of FIG. 7 does not necessitate a soldering step and the lead wires 80 are also unnecessary, enabling reductions in the cost of the handgun-shaped controller.

Note that the present invention is not limited to the above-described embodiments and thus various modifications thereto are possible.

For example, the methods described with reference to FIGS. 7, 12A, 12B, and 13 are particularly preferable as the method of covering the optical sensor and lens with a light-proof member (broadly speaking: light-proof case), but the present invention is not limited thereto and various modifications are possible.

In addition, it is particularly preferable that the method of FIG. 2 is used as the method of detecting the position indicated by the position indication device (broadly speaking: the handgun-shaped controller), but the present invention is not limited thereto.

It is particularly preferable that the present invention is applied to the use of a handgun-shaped controller, but it can also be applied to various other position indication devices such as game controllers other than handgun-shaped controllers.

In addition to domestic game systems, the present invention can also be applied to various other imaging systems such as large-scale attractions in which many players can participate, simulators, and multimedia terminals.

What is claimed is:

1. A position indication device for indicating a position within a screen of a display device, the position indication device comprising:
   an indicator body that indicates a position within a screen of a display device;
   a lens that is provided in the indicator body and focuses light that is incident from a position indicated by the indicator body through a light-incident aperture of the indicator body;
   an optical sensor that is provided in the indicator body and detects light focused by the lens; and
   a light-proof member that is provided in the indicator body and covers the lens and the optical sensor completely in such a manner that external light other than light from the light-incident aperture is not incident on the lens and the optical sensor.

2. The position indication device as defined by claim 1, wherein the light-proof member covers the optical sensor in such a manner as to prevent the incidence of external light to all surfaces of the optical sensor, including a surface on which a signal terminal of the optical sensor is provided.

3. The position indication device as defined by claim 2, wherein the light-proof member covers at least a board portion on which the optical sensor is mounted, of a board for mounting the optical sensor.

4. The position indication device as defined by claim 2, wherein:
   the light-proof member is configured of an assembly of a plurality of parts; and
   a cut-out portion is provided in a connection portion between parts of the light-proof member, in order to form a through-hole for the signal terminal of the optical sensor.

5. The position indication device as defined by claim 2, wherein:

the light-proof member is configured of an assembly of a plurality of parts; and a protuberant portion is provided in a connection portion of a first part of the plurality of parts, and also a fit portion that fits with the protuberant portion is provided in a connection portion of a second part of the plurality of parts.

6. The position indication device as defined by claim 2, wherein:

the light-proof member covers a board portion on which the optical sensor is mounted, of a board for mounting the optical sensor; and a second light-proof member is provided to prevent the incidence of the external light from a gap between the board and a slit provided in the light-proof member for the insertion of the board.

7. The position indication device as defined by claim 6, wherein:

the light-proof member is configured of an assembly of a plurality of parts; and the second light-proof member is a protuberant portion that is deformed by the insertion of the board into the slit provided in each part of the light-proof member and seals the gap between the slit and the board.

8. The position indication device as defined by claim 1, wherein the light-proof member covers at least a board portion on which the optical sensor is mounted, of a board for mounting the optical sensor.

9. The position indication device as defined by claim 8, wherein:

the light-proof member is configured of an assembly of a plurality of parts; and a cut-out portion is provided in a connection portion between parts of the light-proof member, in order to form a through-hole for a signal terminal of the optical sensor.

10. The position indication device as defined by claim 8, wherein:

the light-proof member is configured of an assembly of a plurality of parts; and a protuberant portion is provided in a connection portion of a first part of the plurality of parts, and also a fit portion that fits with the protuberant portion is provided in a connection portion of a second part of the plurality of parts.

11. The position indication device as defined by claim 8, wherein:

the light-proof member covers the board portion on which the optical sensor is mounted, of the board for mounting the optical sensor; and a second light-proof member is provided to prevent the incidence of the external light from a gap between the board and a slit provided in the light-proof member for the insertion of the board.

12. The position indication device as defined by claim 11, wherein:

the light-proof member is configured of an assembly of a plurality of parts; and the second light-proof member is a protuberant portion that is deformed by the insertion of the board into the slit provided in each part of the light-proof member and seals the gap between the slit and the board.

13. The position indication device as defined by claim 1, wherein:

the light-proof member is configured of an assembly of a plurality of parts; and a protuberant portion is provided in a connection portion of a first part of the plurality of parts, and also a fit portion that fits with the protuberant portion is provided in a connection portion of a second part of the plurality of parts.

14. The position indication device as defined by claim 13, wherein:

the light-proof member covers a board portion on which the optical sensor is mounted, of a board for mounting the optical sensor; and a second light-proof member is provided to prevent the incidence of the external light from a gap between the board and a slit provided in the light-proof member for the insertion of the board.

15. The position indication device as defined by claim 14, wherein:

the light-proof member is configured of an assembly of a plurality of parts; and the second light-proof member is a protuberant portion that is deformed by the insertion of the board into the slit provided in each part of the light-proof member and seals the gap between the slit and the board.

16. A position indication device for indicating a position within a screen of a display device, the position indication device comprising:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the light-proof member is configured of an assembly of a plurality of parts; and a cut-out portion is provided in a connection portion between parts of the light-proof member, in order to form a through-hole for a signal terminal of the optical sensor.

17. The position indication device as defined by claim 16, wherein:

the light-proof member is configured of an assembly of a plurality of parts; and a protuberant portion is provided in a connection portion of a first part of the plurality of parts, and also a fit portion that fits with the protuberant portion is provided in a connection portion of a second part of the plurality of parts.

18. The position indication device as defined by claim 16, wherein:

the light-proof member covers a board portion on which the optical sensor is mounted, of a board for mounting the optical sensor; and a second light-proof member is provided to prevent the incidence of the external light from a gap between the board and a slit provided in the light-proof member for the insertion of the board.

19. The position indication device as defined by claim 18, wherein:

the light-proof member is configured of an assembly of a plurality of parts; and the second light-proof member is a protuberant portion that is deformed by the insertion of the board into the slit provided in each part of the light-proof member and seals the gap between the slit and the board.

20. A position indication device for indicating a position within a screen of a display device, the position indication device comprising:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the light-proof member covers a board portion on which the optical sensor is mounted, of a board for mounting the optical sensor; and a second light-proof member is provided to prevent the incidence of the external light from a gap between the board and a slit provided in the light-proof member for the insertion of the board.

21. The position indication device as defined by claim 20, wherein:

the light-proof member is configured of an assembly of a plurality of parts; and the second light-proof member is a protuberant portion that is deformed by the insertion of the board into the slit provided in each part of the light-proof member and seals the gap between the slit and the board.

22. A position indication device for indicating a position within a screen of a display device, the position indication device comprising:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the light-proof member covers the entirety of a board on which the optical sensor is mounted; and a second light-proof member is provided to prevent the incidence of external light from a gap between a lead wire from the board and a lead hole provided in the light-proof member for the extraction of the lead wire.

23. A position indication device for indicating a position within a screen of a display device, the position indication device comprising:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the optical sensor is installed directly within the light-proof member; and a second light-proof member is provided to prevent the incidence of external light from a gap between a lead wire from a signal terminal of the optical sensor and a lead hole provided in the light-proof member for the extraction of the lead wire.

24. A game system that comprises:

a computer-usable information storage medium used in the game system;

a position indication device for indicating a position within a screen of a display device;

a game processing section that receives information from the position indication device and performs game processing based on the detected indicated position; and an image generation section that generates a game image in accordance with the game processing performed by the game processing section, wherein the information storage medium comprises a program for implementing the above sections on a computer; and wherein the position indication device comprises:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor completely in such a manner that external light other than light from the light-incident aperture is not incident on the lens and the optical sensor.

25. A game system that comprises:

a computer-usable information storage medium used in the game system;

a position indication device for indicating a position within a screen of a display device;

a game processing section that receives information from the position indication device and performs game processing based on the detected indicated position; and an image generation section that generates a game image in accordance with the game processing performed by the game processing section, wherein the information storage medium comprises a program for implementing the above sections on a computer, and wherein the position indication device comprises:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the light-proof member is configured of an assembly of a plurality of parts; and a cut-out portion is provided in a connection portion between parts of the light-proof member, in order to form a through-hole for a signal terminal of the optical sensor.

26. A game system that comprises:

a computer-usable information storage medium used in the game system;

a position indication device for indicating a position within a screen of a display device;

a game processing section that receives information from the position indication device and performs game processing based on the detected indicated position; and an image generation section that generates a game image in accordance with the game processing performed by the game processing section, wherein the information storage medium comprises a program for implementing the above sections on a computer, and wherein the position indication device comprises:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the light-proof member covers a board portion on which the optical sensor is mounted, of a board for mounting the optical sensor; and a second light-proof member is provided to prevent the incidence of the external light from a gap between the board and a slit provided in the light-proof member for the insertion of the board.

27. A game system that comprises:

a computer-usable information storage medium used in the game system;

a position indication device for indicating a position within a screen of a display device;

game processing section that receives information from the position indication device and performs game processing based on the detected indicated position; and image generation section that generates a game image in accordance with the game processing performed by the game processing section, wherein the information storage medium comprises a program for implementing the above sections on a computer, and wherein the position indication device comprises:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the light-proof member covers the entirety of a board on which the optical sensor is mounted; and a second light-proof member is provided to prevent the incidence of external light from a gap between a lead wire from the board and a lead hole provided in the light-proof member for the extraction of the lead wire.

28. A game system that comprises:

a computer-usable information storage medium used in the game system;

a position indication device for indicating a position within a screen of a display device;

game processing section that receives information from the position indication device and performs game processing based on the detected indicated position; and image generation section that generates a game image in accordance with the game processing performed by the game processing section, wherein the information storage medium comprises a program for implementing the above sections on a computer, and wherein the position indication device comprises:

an indicator body that indicates a position within a screen of a display device;

a lens that is provided in the indicator body and focuses light that is incident from a position indicated by the indicator body through a light-incident aperture of the indicator body;

an optical sensor that is provided in the indicator body and detects light focused by the lens; and a light-proof member that is provided in the indicator body and covers the lens and the optical sensor in such a manner that external light other than light from the light-incident aperture is not incident on the lens and the optical sensor, wherein:

the optical sensor is installed directly within the light-proof member; and a second light-proof member is provided to prevent the incidence of external light from a gap between a lead wire from a signal terminal of the optical sensor and a lead hole provided in the light-proof member for the extraction of the lead wire.

* * * * *